June 3, 1930.  R. T. WILLIAMS  1,761,002
EMERGENCY LIGHTING SYSTEM
Filed July 16, 1927
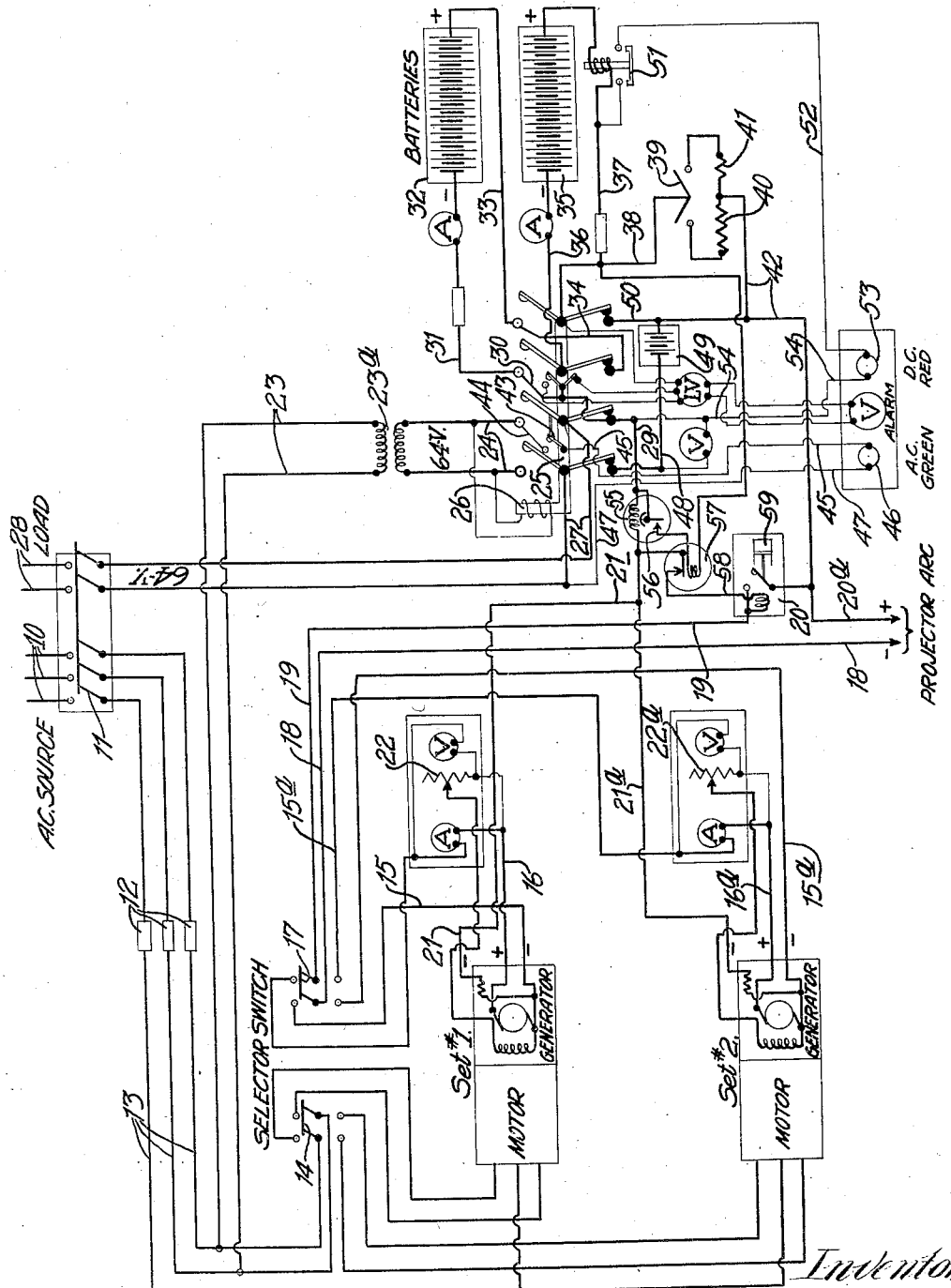
Inventor
Ralph T. Williams,
By Dyrenforth, Lee, Chritton & Wiles,
Attys.

Patented June 3, 1930

1,761,002

UNITED STATES PATENT OFFICE

RALPH T. WILLIAMS, OF CHICAGO, ILLINOIS, ASSIGNOR TO ROTH BROS. & CO., OF CHICAGO, ILLINOIS, A CORPORATION OF ILLINOIS

EMERGENCY LIGHTING SYSTEM

Application filed July 16, 1927. Serial No. 206,360.

This invention relates to emergency lighting systems and is particularly adapted to be used in motion picture theaters.

The invention is fully described in the following specification and shown in the accompanying drawing which shows diagrammatically the layout of parts composing the system.

The embodiment illustrated shows a source of three-phase alternating current 10 which is brought into the main switch 11 which connects through fuses 12 with the alternating current leads 13. One of these, 13ª, connects with both the motor generator sets Nos. 1 and 2. The other two leads 13 are carried to the motor selector switch 14 which is a double-pole double-throw switch capable of connecting either of these motors on the alternating current line 13.

The generator in each of these sets is preferably compound wound. In set No. 1 the negative lead 15 and the positive lead 16 are led to the generator selector switch 17 which is also a double-pole double-throw switch. The central poles of the switch are connected to leads 18 and 19 which are connected to the arc of the motion picture projector, the lead 19 being connected thereto through a reverse current relay 20 whose operation will later be explained. The series lead 21 from the generator No. 1 is connected to the lead 19 through the coil of the reverse current relay 20.

The leads 15ª, 16ª and 21ª of the generator of the set No. 2 are similarly connected to the leads 18 and 19 which go to the projector arc.

Thus it will be seen from the apparatus described that upon closing the switch 11 and throwing the switch 14 either up or down that the motor of either set No. 1 or set No. 2 will be started. Upon throwing switch 17 in the same direction, the generator then in operation delivers current through the leads 18 and 19 and the relay 20 which is normally closed to the projector arc. The voltage of the generator is controlled by means of the rheostat 22 or 22ª as the case may be.

Leads 23 connect two of the alternating current leads 13 with the primary of the transformer 23ª, the secondary of which connects through leads 24 with two of the poles of a current-operated switch 25. This switch is controlled by means of a solenoid 26 which is shunted across the leads 24. When current flows through the solenoid 26, the switch 25 is drawn up so as to connect the leads 24 with leads 27 which are connected through the main switch 11 with the lighting load 28 of the motion picture theater. It is particularly necessary to note that the exit lights of the theater are on the circuit 28 and that it is very necessary that these lights be kept burning at all times that the theater is occupied. If, for any reason, current fails to flow through the solenoid 26, it releases the switch 25 which drops by gravity to the position shown in the diagram. In that case the leads 24 from the secondary of the transformer are disconnected from the leads 27 and current from another source is then connected, as will later be explained, so as to provide a means for supplying current to the exit lights.

The negative lead 21 from the generator connects through the wire 29 with one of the poles of the lower side of the switch 25. This pole connects through a lead 30 on the back of the switch with a lead 31 which connects with the negative end of the storage battery section 32, the positive of this section being connected through a lead 33 with a pole on the upper side of the switch 25. This pole connects through a lead 34, also on the back of the switch, with a pole on the lower side of the switch.

The second section of storage batteries 35 has its negative connected through a lead 36 with one of the knives of the switch 25 while the adjacent knife connects through a lead 37 with the positive end of the battery section 35. These two battery sections are substantially similar and are preferably 40 volts each while the potential of the generators is 70 volts and the line 28 is designed to operate at 64 volts.

During normal operation of the system, the switches 14 and 17 are thrown in the same direction thereby causing one of the motor-generator sets to furnish direct current for the projector arc, the relay 20 remaining closed.

At the same time alternating current from the transformer 23ª passes through the leads 24 to the switch 25 which is held closed by means of the solenoid 26 thereby supplying alternating current through the leads 27 and 28 to the house lighting load.

At the same time direct current at a potential of 70 volts is supplied through the leads 29, 30 and 31 to the storage battery section 32 and through the leads 29, 30 and 36 to the storage battery section 35. The return from these battery sections 32 is through leads 33 and 37 and thence to the knife of the switch and the lead 38 to the switch 39 which may be thrown either on the relatively high resistance 40 for trickle charging or on the lower resistance 41 for more rapid charging and thence through the lead 42 to the line 20ª leading to the projector arc. Thus it will be seen that the battery may be charged at either a high or a low rate by closing the switch 39 through one resistance or the other.

During this time that the switch 25 is held closed by the solenoid 26, the switch knife 43, also operated by the solenoid, makes contact with the switch pole 44 thereby connecting one of the leads 24 with the lead 45 which lights the green lamp 46, the current returning through the lead 47.

In case the alternating current from the source 10 fails for any reason, with the switches set as have just been described for operation on alternating current, the solenoid 26 will permit the switch 25 to fall by gravity to the full line position shown in the diagram thereby breaking all the connections on the upper side of the switch and closing those on the lower side. When this happens the negative pole of the storage battery section 35 is connected through the leads 36, 34 and 33 with the positive terminal of the battery section 32. The negative of the section 32 is then connected through leads 31, 30 and 27 with the house lighting wires 28. The return to the batteries from the other wire 27 is through the switch to the lead 48, thence through the cells of the counter E. M. F. battery 49 and through the leads 50 and 37 to the positive pole of the battery section 35. When current thus flows through the lead 37, it closes the reverse current relay 51 which then causes current to flow through the lead 52 which supplies current to the red light 53 which is located on the switchboard. The return is through the lead 54 which connects with the lead 27. This shift from the green light 46 to the red light 53 indicates that the alternating current has failed and that the house lighting is now shifted to the storage battery. At the same time, current for the projector arc is supplied by the storage battery, the positive of the section 35 being connected through the leads 37, 50, 42 and 20ª while the negative of the section 32 is connected thereto through the leads 31, 30, 29, 21, the series field, the leads 15 and 18. As this current from the storage battery flows through the ammeter 55, its needle is deflected in the opposite direction and engages a contact 56 which actuates a relay 57 to close the circuit through the lead 58 which in turn actuates the relay 20, causing it to open the circuit between the leads 19 and 20ª. Thus, the weak current flowing through the contact 56 serves to operate the relay 57 which passes a current of sufficient strength through the relay 20 to quickly open it against the dashpot 59. The action of this dashpot in closing is so slow as to prevent the relay closing until the motor-generator has stopped. Without the dashpot, chattering of the relay 20 would occur so long as the motor-generator continued to rotate. With the switches in the positions described and the source of alternating current 10 inoperative for any reason so that current for both the lighting load 28 and the projector arc is supplied by the storage batteries, resumption of current from the alternating current source 10 will cause current to flow through the transformer 23ª thereby causing the solenoid 26 to throw the switch 25 to the upper position. At the same time, the motor-generator set is placed in operation and direct current from the generator is then supplied to the projector arc. At the same time the house lighting current 28 is connected to the transformer 23ª, all as previously described.

The purpose of the counter E. M. F. battery 49 is to lower the voltage somewhat on the house lighting circuit 28 which, in this instance, requires less voltage than that of the projector arc which is here taken as about 70 volts, while the house lighting circuit here used is operated at 64 volts. It will be understood that the various voltages given herein are only illustrative. The control switch 11 is shown manually operated but may be automatic if desired.

While I have shown and described but a single embodiment of this invention, it is to be understood that it is capable of many modifications. Changes, therefore, in the construction and arrangement may be made which do not depart from the spirit and scope of the invention as disclosed in the appended claims in which it is my intention to cover all novelty inherent in the invention as broadly as possible in view of the prior art.

What I regard as new and desire to secure by Letters Patent is:

1. In an emergency lighting system, a source of alternating current, a motor-generator adapted to be driven thereby, a lighting circuit, a storage battery made up of a plurality of sections, and a voltage-controlled switch adapted to connect said battery sections in parallel on said generator while the latter is driven by said alternating current and to connect said battery sections in series to said lighting circuit when the source of alternating current fails.

2. In an emergency lighting system, a source of alternating current, a motor-generator adapted to be driven thereby, a lighting circuit, a transformer connected to said source and having a secondary adapted to supply current to said lighting circuit, a storage battery made up of a plurality of sections, and a voltage control switch adapted to connect said battery sections in parallel on said generator while the latter is driven by said alternating current and to connect said battery sections in series to said lighting circuit when the source of alternating current fails.

3. In an emergency lighting system, a source of alternating current, a motor-generator adapted to be driven thereby, a lighting circuit, a storage battery made up of a plurality of sections, and a switch normally held closed by said alternating current and adapted to connect said battery sections in parallel on said generator while the latter is driven by said alternating current and to connect said battery sections in series to said lighting circuit when the source of alternating current fails.

4. In an emergency lighting system, a source of alternating current, a motor-generator adapted to be driven thereby, a lighting circuit, a transformer connected to said source and having a secondary adapted to supply current to said lighting circuit, a projector arc circuit normally fed by said generator, a storage battery made up of a plurality of sections, and a voltage-controlled switch adapted to connect said battery sections in parallel on said generator while the latter is driven by said alternating current and to connect said battery sections in series to said lighting circuit and said projector arc circuit when the source of alternating current fails.

5. In an emergency lighting system, a source of alternating current, a motor-generator adapted to be driven thereby, a lighting circuit, a transformer connected to said source and having a secondary adapted to supply current to said lighting circuit, a projector arc circuit normally fed by said generator, a storage battery made up of a plurality of sections, a voltage-controlled switch adapted to connect said battery sections in parallel on said generator while the latter is driven by said alternating current and to connect said battery sections in series to said lighting circuit and said projector arc circuit when the source of alternating current fails, and a reverse current relay for connecting the generator with the projector arc circuit while the generator is in operation and quickly disconnecting said generator from the arc circuit when current flows from the battery into the arc circuit.

6. In an emergency lighting system, a source of alternating current, a motor-generator adapted to be driven thereby, a lighting circuit, a transformer connected to said source and having a secondary adapted to supply current to said lighting circuit, a projector arc circuit normally fed by said generator, a storage battery made up of a plurality of sections, a voltage-controlled switch adapted to connect said battery sections in parallel on said generator while the latter is driven by said alternating current and to connect said battery sections in series to said lighting circuit and said projector arc circuit when the source of alternating current fails, a reverse current relay for connecting the generator with the projector arc circuit while the generator is in operation and quickly disconnecting said generator from the arc circuit when current flows from the battery into the arc circuit, and means for retarding the closing of said relay.

7. In an emergency lighting system, a source of alternating current, a motor-generator adapted to be driven thereby, a lighting circuit, a transformer connected to said source and having a secondary adapted to supply current to said lighting circuit, a projector arc circuit normally fed by said generator, a storage battery made up of a plurality of sections, a voltage-controlled switch adapted to connect said battery sections in parallel on said generator while the latter is driven by said alternating current and to connect said battery sections in series to said lighting circuit and said projector arc circuit when the source of alternating current fails, a reverse current relay for connecting the generator with the projector arc circuit while the generator is in operation and quickly disconnecting said generator from the arc circuit when current flows from the battery into the arc circuit, and dashpot for retarding the closing of said relay.

In testimony whereof I have hereunto set my hand this 11th day of July, 1927.

RALPH T. WILLIAMS.